United States Patent
Joshi et al.

(10) Patent No.: US 8,588,551 B2
(45) Date of Patent: Nov. 19, 2013

(54) MULTI-IMAGE SHARPENING AND DENOISING USING LUCKY IMAGING

(75) Inventors: Neel Joshi, Seattle, WA (US); Michael Cohen, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 566 days.

(21) Appl. No.: 12/715,347

(22) Filed: Mar. 1, 2010

(65) Prior Publication Data

US 2011/0211758 A1    Sep. 1, 2011

(51) Int. Cl.
*G06K 9/32* (2006.01)

(52) U.S. Cl.
USPC ........... 382/294; 382/260; 382/261; 382/262; 382/263; 382/264

(58) Field of Classification Search
USPC .......................................... 382/294, 260–264
See application file for complete search history.

(56) References Cited

U.S. PATENT DOCUMENTS

| | | | | |
|---|---|---|---|---|
| 5,956,418 A * | 9/1999 | Aiger et al. | | 382/154 |
| 6,075,905 A | 6/2000 | Herman et al. | | |
| 6,084,227 A | 7/2000 | Rhoads | | |
| 6,097,854 A * | 8/2000 | Szeliski et al. | | 382/284 |
| 6,434,265 B1 * | 8/2002 | Xiong et al. | | 382/154 |
| 6,978,051 B2 * | 12/2005 | Edwards | | 382/284 |
| 7,346,226 B2 | 3/2008 | Shyshkin | | |
| 7,756,358 B2 * | 7/2010 | Deng et al. | | 382/294 |
| 7,765,358 B2 * | 7/2010 | Rutherford et al. | | 710/316 |
| 2004/0196282 A1 * | 10/2004 | Oh | | 345/419 |
| 2006/0284976 A1 * | 12/2006 | Girgensohn et al. | | 348/135 |
| 2007/0242900 A1 * | 10/2007 | Chen et al. | | 382/294 |
| 2009/0040386 A1 | 2/2009 | Ishiga | | |
| 2010/0007754 A1 | 1/2010 | Doida | | |

OTHER PUBLICATIONS

Instant Dehazing—Polarization, Schechner et al., IEEE, 0-7695-1272-0, 2001, pp. 325-332.*
Single image Haze removal—prior, He et al., CVPR2009.PDF (Sep. 2009 see IDS filed on Apr. 9, 2010), pp. 1-8.*
Single image dehazing, Raanan Fattal, ACM, vol. 27 No. 3 Article 72 Aug. 2008, pp. 72:1-72:9.*
Shahrokhy, S. Mohammad., "Visual and Statistical Quality Assessment and Improvement of Remotely Sensed Images", Retrieved at << http://www.isprs.org/proceedings/XXXV/congress/yf/papers/950. pdf >>, Proceedings of the 20th Congress of the International Society for Photogrammetry and Remote Sensing (ISPRS '04), Jul. 2004, pp. 5.
Gabarda, et al., "A Model-Based Quality Improvement and Assessment of Hazy Degraded Images", Retrieved at << http://www.eurasip.org/Proceedings/Eusipco/Eusipco2007/Papers/D3L-E01. pdf >>, 15th European Signal Processing Conference (EUSIPCO 2007), Sep. 3-7, 2007, pp. 5.

(Continued)

*Primary Examiner* — Jayesh A Patel
(74) *Attorney, Agent, or Firm* — Lyon & Harr, LLP; Katrina A. Lyon (57) ABSTRACT

The multi-image sharpening and denoising technique described herein creates a clean (low-noise, high contrast), detailed image of a scene from a temporal series of images of the scene. The technique employs a process of image alignment to remove global and local camera motion plus a novel weighted image averaging procedure that avoids sacrificing sharpness to create a resultant high-detail, low-noise image from the temporal series. In addition, the multi-image sharpening and denoising technique can employ a dehazing procedure that uses a spatially varying airlight model to dehaze an input image.

19 Claims, 5 Drawing Sheets

(56) References Cited

OTHER PUBLICATIONS

Gabarda, et al., "Cloud Covering Denoising Through Image Fusion", Retrieved at << http://www.iv.optica.csic.es/page7/page18/assets/IMVC_07.pdf >>, Image and Vision Computing, vol. 25, No. 5, May 2007, pp. 523-530.

Pohl, et al., "Multisensor Image Fusion in Remote Sensing: Concepts, Methods and Applications", Retrieved at <<http://nature.berkeley.edu/~bingxu/UU/spatial/Readings/Pohl1998IJRS.pdf >>, International Journal of Remote Sensing, 1998, pp. 823-854.

Neubert, et al., "Atmospheric and Terrain Correction of Ikonos Imagery Using Atcor3", Retrieved at http://www2.ioer.de/recherche/pdf/2005_neubert_meinel_isprs_hanover.pdf >>, ISPRS Workshop 2005: High-Resolution Earth Imaging for Geospatial Information, (International Archives of Photogrammetry and Remote Sensing, vol. XXXVI, Pt. I/W3), May 17-20, 2005, pp. 6.

Bennett, et al., "Video enhancement using per-pixel virtual exposures", Retrieved at << http://portal.acm.org/citation.cfm?id=1073204.1073272 >>, ACM Transactions on Graphics (TOG), vol. 24, No. 3, Proceedings of ACM SIGGRAPH, Jul. 2005, pp. 845-852.

Black, et al., "A framework for the robust estimation of optical flow. In Computer Vision", Retrieved at << http://ieeexplore.ieee.org/stamp/stamp.jsp?tp=&arnumber=378214&userType=inst >>, Proceedings Fourth International Conference on, Computer Vision, Apr. 1993, pp. 231-236.

Chen, et al., "Spatio-temporal markov random field for video denoising", Retrieved at << http://ieeexplore.ieee.org/stamp/stamp.jsp?arnumber=04270286 >>, pp. 8, 2007.

Fattal, Raanan., "Single image dehazing", Retrieved at << http://portal.acm.org/citation.cfm?ic=1360671 >>, ACM Transactions on Graphics, vol. 27, No. 3, Article 72, Aug. 2008, pp. 10.

Flett, et al., "Optical flow estimation", Retrieved at << http://www.cs.toronto.edu/pub/jepson/teaching/vision/2503/opticalFlow.pdf >>, In N. Paragios, Y. Chen, and O. Faugeras, editors, Handbook of Mathematical Models in Computer Vision, chapter 15 Springer, 2005, pp. 1-23.

Harmeling, et al., "Online blind deconvolution for astronomical imaging", Retrieved at << http://people.kyb.tuebingen.mpg.de/harmeling/pubs/obd_paper.pdf >>, In ICCV '09, May 2009, pp. 7.

He, et al., "Single image haze removal using dark channel prior", Retrieved at << http://research.microsoft.com/en-us/um/people/jiansun/papers/Dehaze_CVPR2009.pdf >>, Conference on Computer Vision on Pattern Recognition 09, 2009, pp. 8.

Kopf, et al., "Deep photo:Model-based photograph enhancement and viewing", Retrieved at << http://portal.acm.org/citation.cfm?id=1457515.1409069 >>, International Conference on Computer Graphics and Interactive Techniques, ACM SIGGRAPH Asia 2008 papers, Dec. 10-13, 2008, pp. 116:1-116:10.

Mackay, et al., "Highresolution imaging in the visible from the ground without adaptive optics: new techniques and results", Retrieved at << http://www.ast.cam.ac.uk/~optics/Lucky_Web_Site/SPIE_5492_13_240604.pdf >>, Proceedings—SPIE the International Society for Optical Engineering, vol. 5492, Part 1, 2004, pp. 8.

Narasimhan, et al., "Removing weather effects from monochrome images", Retrieved at << http://www.ri.cmu.edu/pub_files/pub4/narasimhan_srinivasa_g_2001_1.pdf >>, Proceedings IEEE Conference Computer Vision and Pattern Recognition, 2001, pp. 8.

Perona, et al., "Scale-space and edge detection using anisotropic diffusion", Retrieved at << http://ieeexplore.ieee.org/stamp/stamp.jsp?tp=&arnumber=56205 >>, IEEE Transactions on Pattern Analysis and Machine Intelligence, vol. 12, No. 7, Jul. 1990, pp. 629-639.

Portilla, et al., "Image denoising using scale mixtures of gaussians in the wavelet domain", Retrieved at << http://www.cns.nyu.edu/ftp/lcv/portilla03-preprint-corrected.pdf >>, IEEE Transactions on Image Processing, vol. 12, No. 11, Nov. 2003, pp. 1-13.

Roth, et al., "A framework for learning image priors", Retrieved at << http://ieeexplore.ieee.org/stamp/stamp.jsp?tp=&arnumber=1467533&userType=inst >>, In Conference on Computer Vision and Pattern Recognition, 2005, pp. 8.

Schechner, et al., "Instant dehazing of images using polarization", Retrieved at << http://ieeexplore.ieee.org/stamp/stamp.jsp?tp=&arnumber=990493 >>, IEEE Computer Society Conference on Computer Vision and Pattern Recognition (CVPR'01), vol. 1, Dec. 8-14, 2001, pp. 325-332.

Shum, et al., "Construction of panoramic image mosaics with global and local alignment", Retrieved at << http://research.microsoft.com/pubs/75614/ShumSzeliski-IJCV00.pdf >>, International Journal of Computer Vision, vol. 48, No. 2, Jul. 2002, pp. 1-48.

Simoncelli, et al., "Noise removal via bayesian wavelet coring. Image Processing", Retrieved at << http://ieeexplore.ieee.org/stamp/stamp.jsp?tp=&arnumber=559512&userType=inst >>, Proceedings 3rd International Conference on Image Processing, vol. 1, Sep. 1996, pp. 379-382.

Szeliski, Richard., "Image alignment and stitching: a tutorial", Retrieved at << http://research.microsoft.com/pubs/70092/tr-2004-92.pdf >>, Foundations and Trends in Computer Graphics and Vision, vol. 2, No. 1, Jan. 2006, pp. 89.

Tomasi, et al., "Bilateral filtering for gray and color images", Retrieved at << http://ieeexplore.ieee.org/stamp/stamp.jsp?tp=&arnumber=710815 >>, ICCV, Proceedings of the Sixth International Conference on Computer Vision, Jan. 4-7, 1998, pp. 839-846.

Tumblin, et al., "Why I want a gradient camera", Retrieved at << http://ieeexplore.ieee.org/stamp/stamp.jsp?tp=&arnumber=1467255&userType=inst >>, CVPR, Proceedings of the 2005 IEEE Computer Society Conference on Computer Vision and Pattern Recognition (CVPR'05), vol. 1—vol. 01, Jun. 20-26, 2005, pp. 8.

* cited by examiner

MULTI-IMAGE SHARPENING AND DENOISING USING LUCKY IMAGING

Photographing objects and scenes with high-levels of detail is challenging for a number of reasons. Many aspects of a scene can cause loss of detail, such as noise amplification in low-light conditions, haze for distant objects, object motion, camera motion, and atmospheric disturbances. A way to lessen some of these artifacts is to take and average multiple images, which can help overcome noise and average out other variations. However, while some artifacts are reduced, such as noise, other artifacts can grow, such as image blur from global and local shifts on the image sensor. Artifacts due to averaging over images with small camera motion are amplified when using long focal length lenses, as well as when there is time varying scene motion such as object motion and apparent motion caused by atmospheric refraction.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The multi-image sharpening and denoising technique described herein creates a clean (low-noise, high contrast), detailed image of a scene from a temporal series of images of the scene. The technique, in one embodiment, includes a process of image alignment to remove global and local camera motion plus a novel weighted image averaging procedure that avoids sacrificing sharpness to create a resultant high-detail, low-noise image from the temporal series of images. The technique uses a novel per-pixel weighting scheme that is a function of local sharpness.

In one embodiment, the multi-image sharpening and denoising technique creates an output image by performing the following steps:

1) Performing a global translational alignment of each image in a temporal series of image of a scene to a single image and averaging corresponding pixel values over the resulting images to create a globally aligned average image;

2) Computing a pixel-wise optical flow to the globally aligned average image initialized by the global alignment result for each image to create locally and globally aligned images.

3) For each pixel location, determining a pixel-wise weight for each corresponding pixel in each image.

4) Creating a weighted average image from the set of normalized weights and the globally aligned and locally aligned images.

In one embodiment, the pixel-wise weight is a combination of three weights and a selectivity measure to determine the final weight given to each pixel. The weights measure local sharpness, re-sampling error, and a dust mask. The selectivity is based on a measure of local variance to promote more noise reduction in smooth areas.

In one embodiment the technique employs a dehazing process in concert with the weighting scheme. This dehazing process uses a spatially-varying (in one case, per scanline) airlight color when performing dehazing. The dehazing process can also be used independently from the weighting scheme.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the multi-image sharpening and denoising technique, reference is made to the accompanying drawings, which form a part thereof, and which show by way of illustration examples by which the multi-image sharpening and denoising technique described herein may be practiced. It is to be understood that other embodiments may be utilized and structural changes may be made without departing from the scope of the claimed subject matter.

1.0 Multi-image Sharpening and Denoising Technique.

The following sections provide an overview of the multi-image sharpening and denoising technique, as well as an exemplary architecture and processes for employing the technique. Additionally, a dehazing procedure employed in one embodiment of the technique is also described.

1.1 Overview of the Multi-Image Sharpening and Denoising Technique

As discussed previously, distant objects are difficult to photograph well. Seeing detail of objects in the distance requires lenses with a very long focal length, thus even small motions of the camera during exposure cause significant blur. But a most vexing problem is atmospheric haze which often leads to the majority of photons arriving from scattering in the intervening media rather than from the object itself. Even if the haze is fully removed, there are only a few bits of signal remaining for displaying the object, thus quantization noise becomes a significant problem. Other noise characteristics of the sensor are also increased in the contrast expansion following haze removal. Variations in the density of air also cause refraction, thus photons cannot be counted on to travel in straight lines. Finally, small dust particles on the sensor that cause invisible artifacts on the original images can become prominent after haze removal.

The multi-image sharpening and denoising technique described herein uses a novel weighted image averaging that avoids sacrificing sharpness when combining images. Residual mis-alignments after flow warping, interpolation during bilinear resampling, dust on the sensor, and varying atmospheric blur all lead to artifacts when using only a simple average to create an image from multiple images. To overcome these issues the technique, in one embodiment, employs a novel per-pixel weighting scheme that is a function of local sharpness to create an image from multiple images.

1.2 Exemplary Architecture/System

Figure 1:
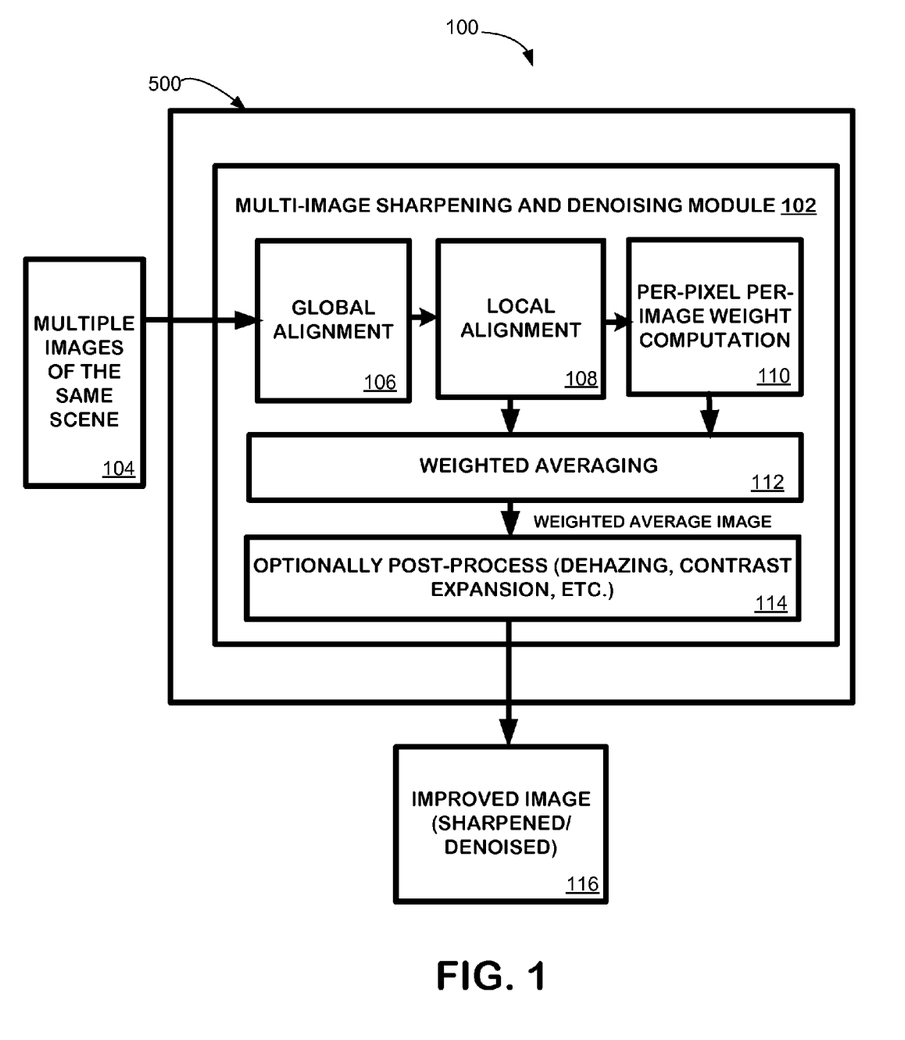
FIG. 1 is an exemplary architecture for employing one exemplary embodiment of the multi-image sharpening and denoising technique described herein.

FIG. 1 provides an exemplary architecture 100 for employing one embodiment of the multi-image sharpening and denoising technique. As shown in FIG. 1, the architecture 100 employs a multi-image sharpening and denoising module 102 that resides on a computing device 500, which will be discussed in greater detail with respect to FIG. 5.

The multi-image sharpening and denoising module 102 operates to create a sharpened and denoised image from a set of input images of the same scene. As shown in block 104, multiple images of the scene taken in a sequence are input into the multi-image sharpening and denoising module. A global translational alignment of each image to a single image of the input images is performed in a global alignment module (block 106) and pixel values of the globally translationally aligned images are then averaged to create a globally aligned average image. A pixel-wise optical flow is then performed to the globally aligned average image initialized by the global alignment result for each image in a local alignment module 108. For each pixel location, a pixel-wise weight for each corresponding pixel in each image is then computed in a pixel-wise weight computation module 110 and these pixel-wise weights are normalized. A weighted average image is created from the set of normalized pixel-wise weights and warped (globally and locally aligned) images in a weighted averaging module 112. The output is a weighted average image that is sharpened and denoised. It is then possible to further post-process 114 the weighted average image (for dehazing, contrast expansion, etc.) if desired to yield an improved image 116. Details of this embodiment, and others, will be discussed later in Section 1.4.

1.3. Exemplary Processes Employed by the Multi-Image Sharpening and Denoising Technique The following paragraphs provide descriptions of exemplary processes employed by various embodiments of the multi-image sharpening and denoising technique.

1.3.1 Multi-Image Sharpening and Denoising Processes.

Figure 2:
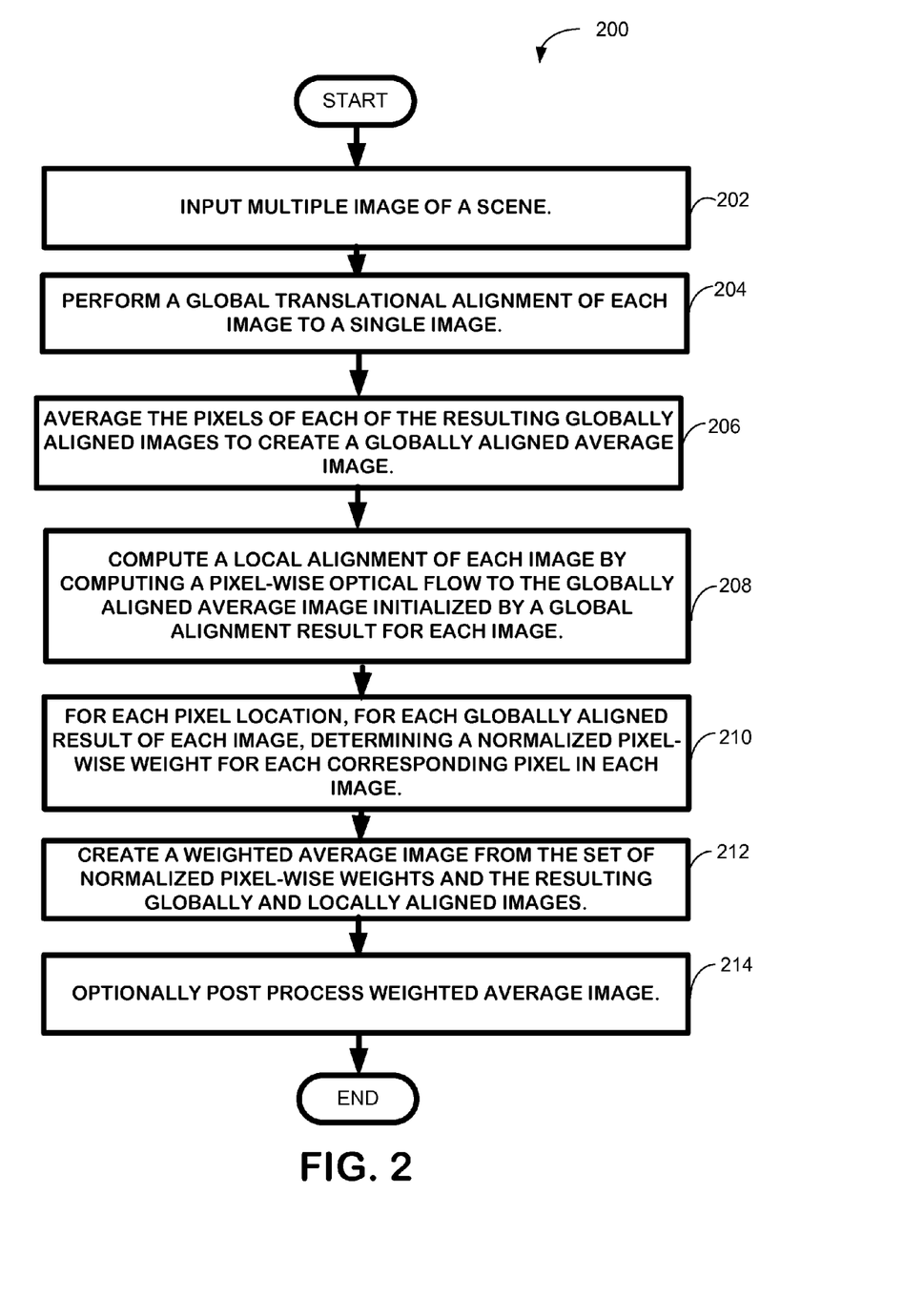
FIG. 2 depicts a flow diagram of an exemplary process for employing the multi-image sharpening and denoising technique described herein.

A high level flow diagram of a process for employing one embodiment of the multi-image sharpening and denoising technique is shown in FIG. 2. This embodiment 200 of the technique creates an improved (denoised and sharpened) image of objects in the distance from multiple images of the same scene by employing global and local alignment and pixel-wise weighting. As shown in FIG. 2, block 202, multiple images of a scene are input. A global translational alignment of each image to a single image is then performed, as shown in block 204. The pixels of each the resulting globally aligned images are averaged to create a globally aligned average image (block 206). A local alignment of each of the resulting globally aligned images is performed by computing a pixel-wise optical flow to the globally aligned average image initialized by a global alignment result for each image, as is shown in block 208. For each pixel location, for each globally and locally aligned result of each image, a normalized pixel-wise weight for each corresponding pixel in each image is computed (block 210). Once the pixel-wise weights are computed, a weighted average image is created from the set of normalized pixel-wise weights and the resulting globally and locally aligned images, as is shown in block 212. This weighted average image is a sharpened and denoised image based on the multiple input images. The weighted average image can then be further post-processed if desired, such as, for example, by dehazing and contrast expansion, as shown in block 214. Details for implementing this embodiment will also be provided in Section 1.4.

Figure 3:
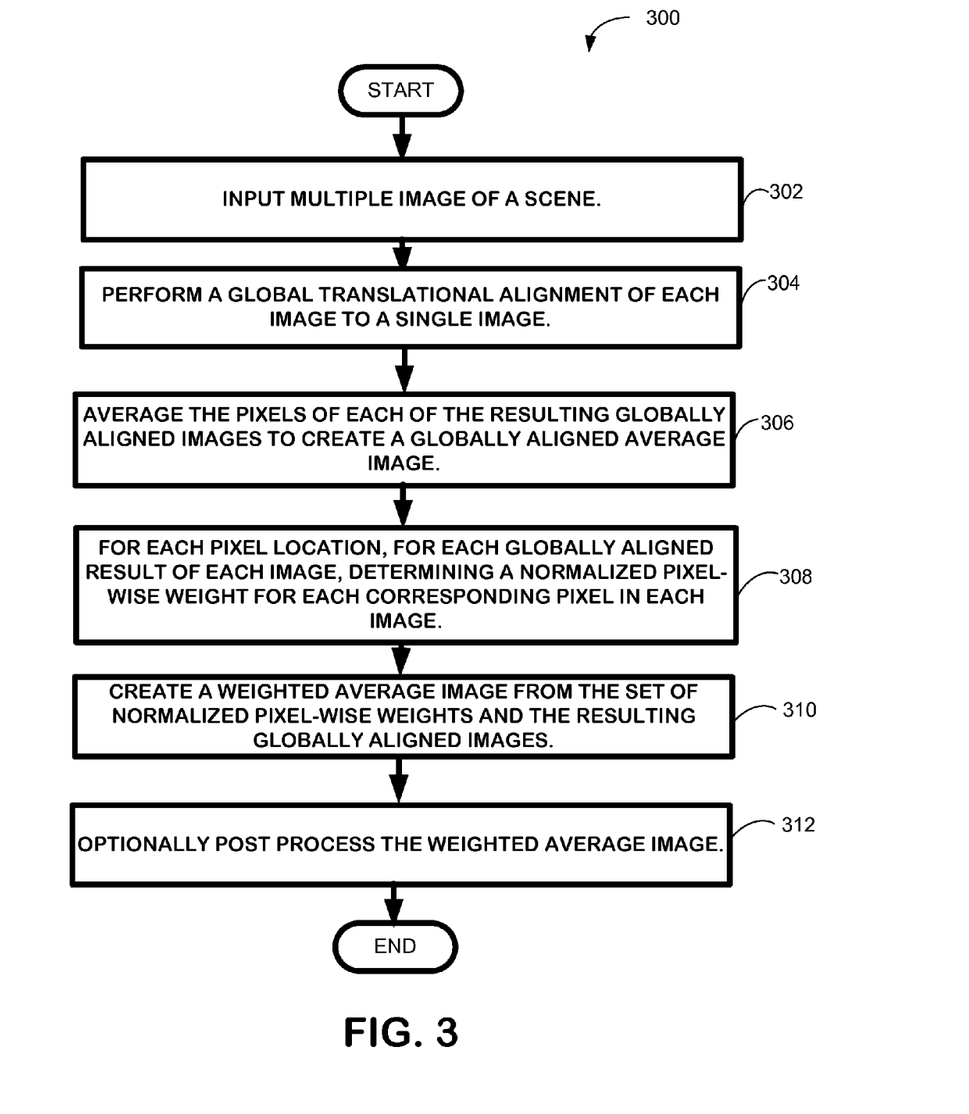
FIG. 3 depicts another flow diagram of an exemplary process for employing the multi-image sharpening and denoising technique described herein wherein no local alignments are performed.

FIG. 3 provides a flow diagram of another exemplary process 300 employed by the multi-image sharpening and denoising technique. In this embodiment, no local alignment takes place.

In this embodiment, as shown in FIG. 3, block 302, multiple images of a scene are input. Like the previously discussed embodiments, a global translational alignment of each image is performed to a single image, as shown in block 304. The pixels of each the resulting globally aligned images are averaged to create a globally aligned average image, as shown in block 306. Then, as shown in block 308, for each pixel location, for each global alignment result of each image, a normalized pixel-wise weight is determined for each corresponding pixel in each image. A weighted average image is created from the set of normalized pixel-wise weights and the resulting globally aligned images, as shown in block 310. The weighted average image can then be further post-processed if desired, as shown in block 312. Like the previously discussed embodiments, aspects of this embodiment are also discussed in greater detail in Section 1.4.

1.3.2 Dehazing.

In addition to performing image sharpening and denoising one embodiment of the multi-image sharpening and denoising technique performs image dehazing. This image dehazing can be used in conjunction with the previously discussed embodiments of the technique or as a standalone application.

Figure 4:
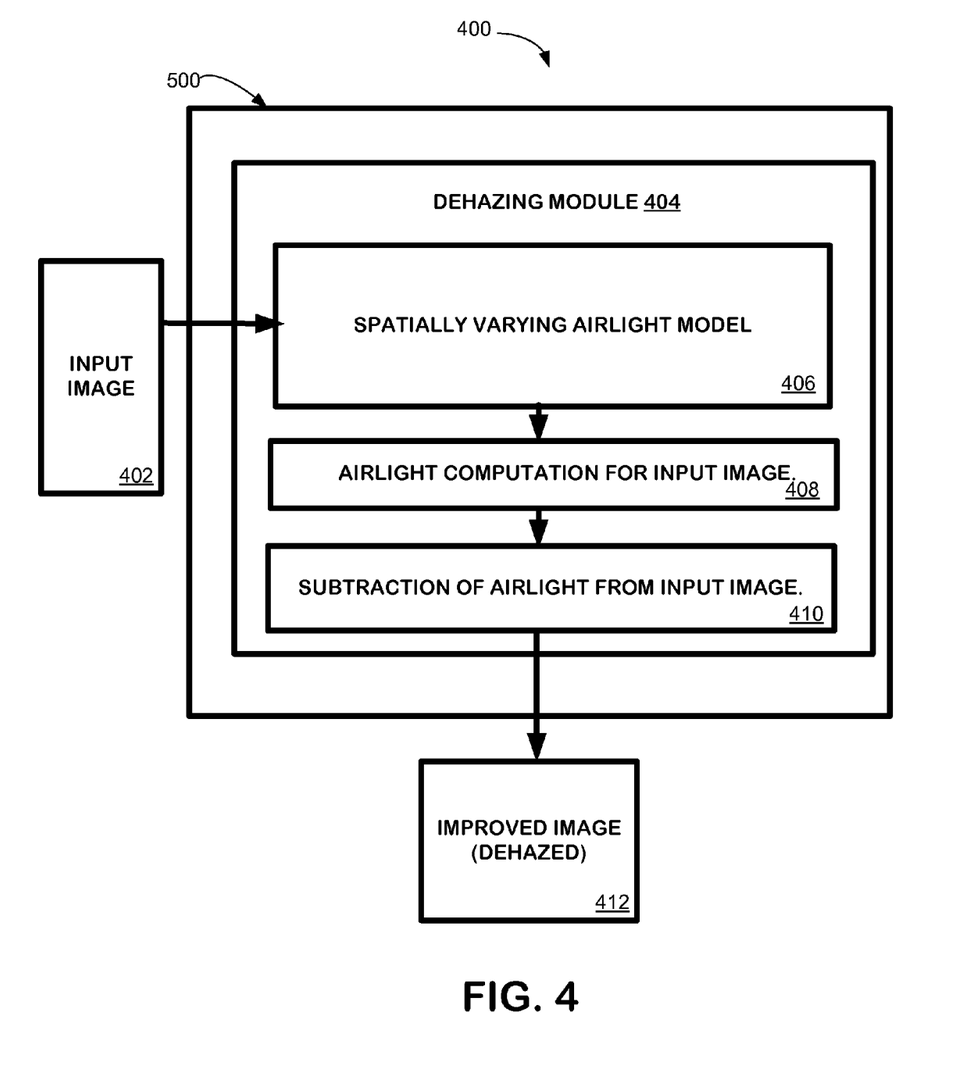
FIG. 4 depicts a system diagram of an exemplary architecture for dehazing an image used by one embodiment of multi-image sharpening and denoising technique described herein.

FIG. 4 provides an exemplary architecture 400 for dehazing an input image 402. The system for dehazing an image includes a dehazing module 404 that uses an airlight model 406. The dehazing module 404 resides on a general purpose computing device 500 with a computer program of program modules, as will be discussed in greater detail with respect to FIG. 5. As shown in FIG. 4, an image 402 is input into the dehazing module 404. An air light color in the input image is computed in an airlight computation module 408 by using a spatially varying air light model 406. The input image 402 is then dehazed by subtracting the airlight computed by subtracting the spatially varying airlight model from the input image (block 410). The output is a dehazed image (block 412). Details of the dehazing technique described herein are provided in Section 1.5.

1.4 Details of Exemplary Embodiments

The following paragraphs provide details of the embodiments described above and related exemplary computations.

1.4.1. Imaging Distant Objects.

To create a clean (sharpened, denoised) image of a distance object the technique works from a temporal series of images. For each of these images, $I_t$, one can observe at each pixel, p, the following:

$$I_t(p) = D(p)[B(p + \Delta_t(p)) \otimes \qquad (1)$$
$$[J(p + \Delta_t(p))\alpha(p + \Delta_t(p)) + A(1 - \alpha(p + \Delta_t(p)))] + N_t(p)$$

where J(p) will represent a measure (after tone-mapping) of the true radiance reflecting from the distant object in a given direction. The term $\Delta_t(p)$ expresses the pixel's offset due to the shifts of the camera's orientation and the air turbulence that may have refracted the light to arrive from different direction. The term $\alpha(p+\Delta_t(p))$ expresses the attenuation of light due to atmospheric scattering, and A is the airlight. The total radiance recorded at a pixel due to airlight goes up just as the true radiance from the distant object is attenuated. B(p+$\Delta_t(p)$) captures any blurring that may occur due to atmospheric scattering and in-camera defocus resulting in a point spread on the image. D(p) is another attenuation factor due to dust on the sensor. Finally $N_r(p)$ is a zero mean additive noise as a result of both quantization and shot noise. One goal is to extract an image which is as close as possible to J(p) using a temporal series of such observations. Thus the technique attempts to undo the spatial shifts $\Delta_t(p)$, as well as removes the airlight and minimizes the corruption due to blur, noise, and sensor dust.

1.4.2. Input and System Overview

In general, as previously discussed, the multi-image sharpening and denoising technique creates a final image from an input temporal sequence of images of a scene. For example, in one working embodiment the technique created a final image of Mount Rainier (a towering volcanic mountain against a clear sky) from a sequence of 124 individual images shot at approximately 1 per second on a Canon 1Ds Mark III camera at ISO 100 with a 400 mm lens. The aperture and exposure were at f/14 and 1=200th second. The camera was mounted on a tripod but the shutter release was operated manually. Although the camera's automated sensor cleaning was activated, small dust particles become apparent. The following paragraphs will occasionally refer to this exemplary creation of the final image of Mount Rainier in explaining some of the details of various aspects of the technique.

In one embodiment of the multi-image sharpening and denoising technique, the technique creates a final image using the following steps:
1) Performing a global translational alignment of each image to a single image and averaging the pixels over the resulting images (e.g., see FIG. 1, block 106, FIG. 2, blocks 204, 206; and FIG. 3, blocks 304, 306)
2) Computing a pixel-wise optical flow to the globally aligned average image initialized by the global alignment result for each input image. (e.g., see FIG. 1, block 108 and FIG. 2, block 208)
3) For each pixel location, determining a pixel-wise weight for each corresponding pixel in each image and creating a weighted average image from the set of normalized weights and aligned images. (e.g., see FIG. 1, block 110, 112; FIG. 2, blocks 210, 212; and FIG. 3, blocks 308, 310).
4) Dehazing the result. (e.g., see FIG. 1, 114; FIG. 2, 214; FIG. 3, 312; and FIG. 4)

Each of these steps will be described in more detail below.

1.4.3. Image Alignment

The images of a distant object, such as for example the previously discussed image of Mount Rainier, are typically misaligned due to camera motion and large, temporally varying warping due to atmospheric refraction. Fortunately, while the misalignments can be quite large, several aspects of the setup in photographing a distant image can simplify the alignment process significantly. For example, images taken from many km away with a long focal length are well modeled by an orthographic camera model and if the scene is mostly static, all mis-alignment can assumed to be due to the camera and atmosphere. Also, the lighting of an object in the distance is typically effectively static over the relatively short time the images are taken. Finally, sensor noise is reasonably low during daylight shooting conditions. Given these properties, a straightforward combination of a global translation and local block-based flow allows one to create very well aligned images. For purposes of the following discussion, it will be assumed that these conditions apply.

In one embodiment, the technique's alignment process proceeds in four steps. First, a global translational alignment of each image to a single reference image is performed, for example, by using a full-frame alignment. Both the camera x, y translation and yaw and pitch rotation are modeled by translation by employing an orthographic projection model. The remaining z translation is irrelevant also due to the orthographic projection. Any camera roll is handled in the next step. Next, the technique averages these globally aligned frames to produce a reference frame for the local alignment process. For each pixel in each image, the technique computes the sum-of-squared differences (SSD) between a 5×5 neighborhood around the pixel and a corresponding translated window on the averaged image. The per pixel flow is chosen as the minimum SSD over a ½ pixel discrete sampling within [−5, 5] pixels translation in x and y. This flow vector captures both the camera roll and atmospheric warping. Lastly, the global and local translations are added to determine the offset, $\Delta_t(p)$ for each pixel. These offsets are used to warp each input image, $I_t$ using bilinear interpolation to produce a warped result, $I_t'$, such that $I_t'(p)=I_t(p+\Delta_t(p))$.

It should be noted that in one embodiment of the technique all computations are done in floating point to avoid further quantization errors.

1.4.4. Determining Weights for Averaging

Once the images are aligned, they can be temporally averaged, (i.e., across a stack of pixels), to reduce both sensor and quantization noise. Unfortunately, a simple averaging of these pixels does not produce a result with very high visual quality, due to the errors introduced into the capture process. Residual mis-alignments after flow warping, interpolation during bilinear resampling, dust on the sensor, and varying atmospheric blur all lead to artifacts when using only a simple average. To overcome these issues the technique employs a novel per-pixel weighting scheme that is a function of local sharpness.

There are two main properties believed to be ideal for overcoming errors due to the atmosphere and alignment process. Specifically, the technique's weighting scheme is designed with these two goals in mind:
1) To maximally suppress noise it is best to average over as many samples as possible, and
2) To maximize image sharpness it is best to only average over a few well-aligned, sharp pixels.

It may seem that these goals are contradictory, and they are in some sense—as the number of samples in the average increase, if any of those samples are mis-aligned or blurred, the sharpness of the resulting image will decrease.

The technique's approach to merging these goals is to break-down the per-pixel weight as a combination of sharpness weight and a "selectivity" parameter that governs how many samples are averaged. For both of these aspects the technique draws partly on ideas from "lucky imaging". Lucky imaging is used in earth-based astronomic photography to overcome warping and blurring due to the atmosphere. The lucky imaging technique compensates for atmospheric shifts and blurs by first ranking each image by a sharpness measure which, in the domain of images of stars, is simply the maximum pixel value in the image. Then the top N % (often 1% to 10%) of the images, ranked by sharpness, are aligned with by computing a global translation—this represents the "selectivity" of the averaging process. The resulting images are averaged.

One embodiment of the technique described herein uses a combination of three weights and a selectivity measure to determine the final weight given to each pixel. The weights measure local sharpness, resampling error, and a dust mask. The selectivity is based on a measure of local variance to promote more noise reduction in smooth areas.

1.4.4.1 Sharpness Weight:

In contrast with the astronomy domain, simple intensity is not a meaningful sharpness measure and, as one typically has densely textured images, a full frame metric is not appropriate. Instead, the multi-image sharpening and denoising technique computes a per-pixel weight that is a function of a local sharpness measure. In one embodiment the technique uses a discrete Laplacian of the image as the local sharpness measure and sets the sharpness weight proportional to the magnitude of the Laplacian.

Specifically, consider $L_t'$ to be the convolution of a warped input image $T_t'$ with a 3×3 discrete Laplacian filter, and $L_\mu$ to be the Laplacian of the un-weighted mean image:

$$\mu(p) = \frac{1}{N} \sum_{t=1}^{N} I_t'(p), \qquad (2)$$

where p is a pixel and there are t=[1 ... N] images. The use of $L_\mu$ is discussed later in this section. The sharpness weight for a pixel is then:

$$\omega_{tex}^*(p) = |L_t'(p)|. \qquad (3)$$

Thus, in one embodiment the technique creates a normalized weight, $\omega_{tex}(p)$, by linearly remapping the output range of the absolute value of the Laplacian to the range of [0,1].

1.4.4.2 Resampling:

In addition, the technique considers that smoothing can be introduced during global and local alignment, as in one embodiment the process requires pixels' values to be estimated by a bilinear interpolation of the original input pixel values. If an edge falls across integer pixel coordinates, it is known that the sub-pixel interpolation of that edge will be smoothed. To reduce this type of smoothing, the technique also employs a "resampling" weight that down-weights pixels interpolated at fractional pixel locations as a quadratic function of distance of the fractional location from the nearest integer location. Specifically, $$f_{samp}(p) = 1 - \sqrt{\text{frac}(\Delta_t(p)_x)^2 + \text{frac}(\Delta_t(p)_y)^2} \qquad (4)$$

$$\omega_{samp}^*(p) = f_{samp}(p)^2. \qquad (5)$$

$\Delta_t(p)$ is the total alignment translation of pixel p, and the "frac" function returns the fractional distance to the nearest integer, i.e., frac(x)=min(mod(1), 1−mod(x, 1)).

The technique creates a normalized resampling weight, $\omega_{samp}(p)$ by linearly re-mapping the output range of $\omega_{samp}^*$(p) to the range of [ε,1]. The technique maps to a minimum value of E instead of 0 as it has been observed to yield qualitatively better results when allowing the interpolated pixels have some small non-zero weight. One has found ε=0.1 to work well.

1.4.4.3. Selectivity

As discussed above, it is important to not only weigh pixels by sharpness, but to also have a selectivity parameter. The more selective, i.e., fewer pixels averaged, the sharper the result. One might think that being extremely selective is ideal, which is the approach lucky imaging takes. However, this has as a downside, as with fewer samples, noise is not well suppressed. When averaging a fixed number of images, an equal amount of denoising occurs across the entire image.

Thus, just as one found a full frame sharpness measure to be unsuitable for the images, it was found that a fixed selectivity measure is non-ideal. Therefore, the technique employs a per-pixel selectively measurement that is more selective in areas of high local texture, (i.e. the mountain in the Mount Rainier example), and averages over more samples in areas of low local texture, (i.e., the sky). Specifically, the technique implements this selectivity parameter as an exponent on the technique's per-pixel weights which lie in [0, λ] for some large value λ, the selectivity weight then becomes:

$$\omega_{sharp}(p) = \omega_{samp}(p) * \omega_{tex}(p))^{\gamma(p)} \qquad (6)$$

The exponent is calculated by first computing:

$$\gamma^*(p) = |L_\mu(p)|, \qquad (7)$$

and then the exponent values γ(p) are computed by linearly re-mapping the output range of γ*(p) to the range of [0,λ] for some large value λ. In one embodiment, λ=10 has been found to work well in practice.

1.4.4.4 Dust Removal:

Lastly, in one embodiment, the multi-image sharpening and denoising technique also considers sensor dust. To minimize the effect of sensor dust on the final image the technique leverages the fact that the alignment shifts the dust around from image to image. In one embodiment of the denoising and sharpening technique, dust spots are hand-marked (a single image of the clear sky can be used to automate this step) on a single initial input frame to create a binary dust mask, where a value of 1 indicated the presence of dust. This mask is then warped using the computed global alignment. The dust weight is then: $\omega_{dust}(p)=1-\text{dust}'(p)$ where dust'(p) is the presence of dust in an image.

Only the global alignment is performed on the dust mask and the corresponding pixels in the input image, since the dust texture itself is not part of the true texture. The global alignment shifts the dust over a big enough range so that for any output pixel there will be choices in the pixel stack that do not have dust covering them. This effectively removes the dust spots from the final result.

1.4.4.5 Putting it all Together:

The final per-pixel weight includes the dust mask simply as an additional multiplier to down-weight dust spots:

$$\omega(p) = \omega_{dust} * (\omega_{samp}(p) * \omega_{tex}(p))^{\gamma(p)} \qquad (8)$$

Finally, the technique recovers a denoised and sharpened image J(p) as the weighted sum of warped images:

$$J(p) = \frac{\sum_{t=1}^{N} \omega(p) I_t'(p)}{\sum_{t=1}^{N} \omega(p)} - A(1 - \alpha(p)) \qquad (9)$$

1.5 Dehazing and Contrast Expansion

As previously discussed, in one embodiment of the technique, the sharpened and denoised image can be post-processed to yield an even better image. Once the technique has a denoised image from the per-pixel weighted sum of aligned images, in one embodiment the final step is to dehaze the image. To do this the multi-image sharpening and denoising technique adapts the dark channel method of He et al. to model the haze and airlight color by surmising that in any local region of a haze free image, there is at least one channel of one pixel that is dark. The presence and magnitude of the haze is derived from the darkest pixel channel in some local region. The local region model of He et al. is appropriate for many natural scenes as they often have local dark regions due to shadows or high-frequency textures, e.g., as images of trees, urban environments, etc. However, in many images, such as the aforementioned image of Mount Rainier, there are many large local areas with no dark values, such as the large white glaciers. Thus the local model is not appropriate. Instead, it is noted that as the haze amount, and thus the dark channel value, is proportional to depth; any neighborhood which captures a constant depth and has dark regions can be used to measure the dark channel value. As anyone who has flown into a metropolitan area has witnessed, the air quality and color often takes on a layered appearance.

Therefore, in the previously discussed example of Mount Rainier, due to the relatively conical shape of the mountain as well as the haze's relationship with altitude, it is assumed that the haze is effectively constant per scan-line. In contrast with previous work, the technique does not assume a single global airlight color. Instead the airlight color can vary per-scanline. This is particularly useful in images where the airlight color appears quite different towards the bottom of the image (e.g., the mountain).

The technique estimates the dark channel value as the darkest value per horizontal scanline:

$$[A(1-\alpha(p))] = \min_{x=1}^{W} I(p) \qquad (10)$$

where p is a pixel and W is the image width.

In one embodiment, the multi-image sharpening and denoising technique processes the per-scanline minimum in two ways. The dark channel value is somewhat meaningless in the sky region, as this region is completely airlight. In previous works, pure sky regions were often simply ignored or masked out.

In one embodiment, in the mountain example for example, the technique instead chooses to set the airlight color for the sky above the mountain top to be equal to that at the top of the mountain. This effectively dehazes the sky region up to the depth of the mountain. Furthermore, as the dark-channel values can be somewhat noisy from scanline-to-scanline, the technique smoothes the dark channel image in the vertical direction using a broad 1D Gaussian filter.

The final dehazed image is computed as $I(p)-[A(1-\alpha(p))]$, for an image I. This dehazing operation is not only valid for the final weighted mean. The dehazing operation can be applied in various stages of image processing to obtain different affects.

Finally, in one exemplary embodiment, the technique stretches the contrast by a linear remapping of the luminance to the full image range of [0,1]. The technique color balances the final image using the gray granite of the mountain and white glaciers as a gray and white point.

1.6 Alternate Embodiments

It should be noted that various alternate embodiments are possible. For example, typically digital images are acquired by sampling color on a grid, where R, G, and B sensors are laid out in some pattern. Then to get a full color image, one interpolates and resamples these colors at the pixel locations. This can cause smoothing and color artifacts. To overcome this issue, in one embodiment of the multi-image sharpening and denoising technique, pixels that come from fractional sensor locations are down weighted relative to a color sampling grid (i.e., color filter or Bayer-pattern) of the original raw images. The technique can modify the resampling weights to be different per-color channel, so not only does the technique down-weight fractional locations, but it does it in a way that down-weights fractional or interpolated locations relative to the color filter sensor grid.

2.0 The Computing Environment

The multi-image sharpening and denoising technique is designed to operate in a computing environment. The following description is intended to provide a brief, general description of a suitable computing environment in which the multi-image sharpening and denoising technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
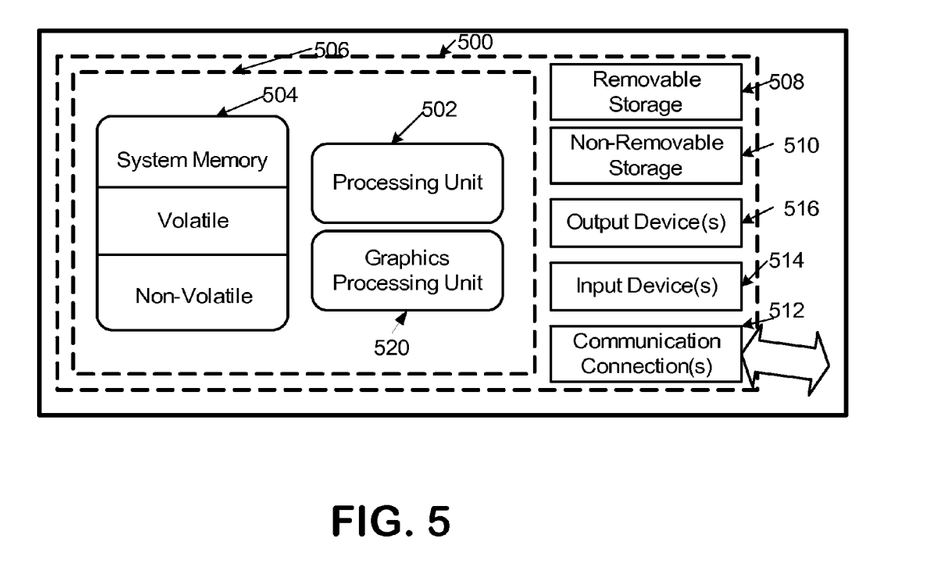
FIG. 5 is a schematic of an exemplary computing device which can be used to practice the multi-image sharpening and denoising technique.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the multi-image sharpening and denoising technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Device 500 also can contain communications connection(s) 512 that allow the device to communicate with other devices and networks. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a display, keyboard, mouse, pen, camera, touch input device, and so on. Output device(s) 516 devices such as a display, speakers, a printer, and so on may also be included. All of these devices are well known in the art and need not be discussed at length here.

The multi-image sharpening and denoising technique may be described in the general context of computer-executable instructions, such as program modules, being executed by a computing device. Generally, program modules include routines, programs, objects, components, data structures, and so on, that perform particular tasks or implement particular abstract data types. The multi-image sharpening and denoising technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for creating an improved image of objects in the distance from multiple images of the same scene, comprising:
    using a computing device for:
        inputting multiple images of a scene,
        performing a global translational alignment of each input image to a single image of the input multiple images of the scene;
        averaging the pixels of each of the resulting globally aligned images to create a globally aligned average image;
        computing a local alignment of each resulting globally aligned image by computing a pixel-wise optical flow to the globally aligned average image initialized by the resulting globally aligned image for each input image;
        for each pixel location, for each globally and locally aligned image, determining a normalized pixel-wise weight for each corresponding pixel in each image; and
        creating a weighted average image from the set of normalized pixel-wise weights and the resulting globally and locally aligned images.

2. The computer-implemented process of claim 1 wherein the normalized pixel-wise weight is a function of local sharpness in each globally and locally aligned image.

3. The computer-implemented process of claim 2, wherein more pixel samples are used in areas of high local texture than in areas of low local texture when computing the normalized pixel-wise weight.

4. The computer-implemented process of claim 1, wherein the normalized pixel-wise weight is a function of how much resampling the pixels have undergone in each globally aligned and locally aligned image.

5. The computer-implemented process of claim 4, wherein fractional pixel alignments are assigned less weight in computing the normalized pixel-wise weight.

6. The computer-implemented process of claim 4, wherein fractional pixel alignments are assigned less weight relative to a color sampling grid.

7. The computer-implemented process of claim 1, wherein the normalized pixel-wise weight is a function of sensor dust.

8. The computer-implemented process of claim 7, wherein a mask is used to remove sensor dust from the weighted average image.

9. The computer-implemented process of claim 1, further comprising post-processing the weighted average image by dehazing the weighted average image.

10. The computer-implemented process of claim 9, wherein dehazing the weighted average image, further comprises employing a spatially varying airlight color when performing dehazing.

11. The computer-implemented process of claim 10, wherein the spatially varying air light color varies by image scan line.

12. The computer-implemented process of claim 10, further comprising post-processing the weighted average image by contrast expanding the weighted average image.

13. A computer-implemented process for creating an improved image from a multiple images of the same scene, comprising:
    using a computing device for:
        inputting multiple images of a scene,
        performing a global translational alignment of each image to a single image of the input multiple images;
        averaging the pixels of each the resulting globally aligned images to create a globally aligned average image;
        for each pixel location, for each global alignment result of each image, determining a normalized pixel-wise weight for each corresponding pixel in each image; and
        creating a weighted average image from the set of normalized pixel-wise weights and the resulting globally aligned images.

14. The computer-implemented process of claim 13, wherein the normalized pixel-wise weight is a function of selecting pixels based on local sharpness.

15. The computer-implemented process of claim 14, further comprising averaging pixels in areas of high texture less than averaging pixels in low texture areas.

16. The computer-implemented process of claim 13, wherein the normalized pixel-wise weight is a function of the resampling of the pixels in each globally aligned image by weighting fractional pixel shifts less than non-fractional pixel shifts.

17. The computer-implemented process of claim 13, further comprising dehazing the weighted average image by employing a spatially varying air light color when performing dehazing.

18. A system for dehazing an image using an air light model, comprising:
    a general purpose computing device;
    a computer program comprising program modules executable by the general purpose computing device, wherein the computing device is directed by the program modules of the computer program to,
    input an image;
    compute an air light color by using a spatially varying air light model that varies air light by horizontal image scanline and that estimates a dark channel value as the darkest value per horizontal image scan line that is used to derive the presence and magnitude of haze, wherein the dark channel value is filtered in a vertical direction; and dehaze the input image by subtracting the air light that varies by horizontal scanline from the corresponding horizontal scanlines of input image.

19. The system of claim 18, further comprising a module for contrast expanding the dehazed image.

* * * * *